(12) United States Patent
Takemoto

(10) Patent No.: US 11,817,622 B2
(45) Date of Patent: Nov. 14, 2023

(54) PROTECTIVE MATERIAL AND WIRELESS COMMUNICATION DEVICE

(71) Applicant: Naofumi Takemoto, Tokyo (JP)

(72) Inventor: Naofumi Takemoto, Tokyo (JP)

(*) Notice: Subject to any disclaimer, the term of this patent is extended or adjusted under 35 U.S.C. 154(b) by 522 days.

(21) Appl. No.: 16/978,284

(22) PCT Filed: Mar. 6, 2019

(86) PCT No.: PCT/JP2019/008974
§ 371 (c)(1),
(2) Date: Sep. 4, 2020

(87) PCT Pub. No.: WO2019/172348
PCT Pub. Date: Sep. 12, 2019

(65) Prior Publication Data
US 2021/0013601 A1   Jan. 14, 2021

(30) Foreign Application Priority Data
Mar. 6, 2018   (JP) .................. 2018-039833

(51) Int. Cl.
*H01Q 1/42* (2006.01)
*H01Q 1/24* (2006.01)
*C09D 175/02* (2006.01)
*C09D 201/00* (2006.01)
*C08K 5/17* (2006.01)
*C08K 5/5419* (2006.01)
(Continued)

(52) U.S. Cl.
CPC ............. *H01Q 1/42* (2013.01); *C09D 175/02* (2013.01); *C09D 201/00* (2013.01); *H01Q 1/24* (2013.01); *C08K 5/17* (2013.01); *C08K 5/5419* (2013.01); *C08K 7/00* (2013.01); *C08K 2003/385* (2013.01)

(58) Field of Classification Search
CPC .......... H01Q 1/42; H01Q 1/24; C09D 175/02; C09D 201/00; C08K 5/17; C08K 5/5419; C08K 7/00; C08K 2003/385
USPC ......................................... 343/872
See application file for complete search history.

(56) References Cited

U.S. PATENT DOCUMENTS 3,023,135 A * 2/1962 Wiltshire ............... B29C 53/66
29/445
5,922,435 A   7/1999 Lee et al.
(Continued)

FOREIGN PATENT DOCUMENTS

CN           105612085 A        5/2016
DE   10 2011 076 501 A1   11/2012
(Continued)

OTHER PUBLICATIONS

Chinese Office Action dated Dec. 15, 2020, in corresponding Chinese Patent Application No. 201980017295.4.
(Continued)

*Primary Examiner* — Hai V Tran
(74) *Attorney, Agent, or Firm* — STAAS & HALSEY LLP

(57) ABSTRACT

Provided is a protective material that protects a wireless communication portion for wireless communication, comprising a substrate formed of a foam synthetic resin and a coating layer of a polyurea resin covering at least a front side
(Continued)

surface of the substrate. The wireless communication device includes a wireless communication portion for wireless communication and a protective material.

18 Claims, 16 Drawing Sheets

(51) Int. Cl.
   *C08K 7/00* (2006.01)
   *C08K 3/38* (2006.01)

(56) References Cited

U.S. PATENT DOCUMENTS

| | | | |
|---|---|---|---|
| 8,313,800 B2* | 11/2012 | Shiraishi | H05K 3/386 |
| | | | 427/58 |
| 9,356,341 B1 | 5/2016 | Meador et al. | |
| 9,774,077 B2* | 9/2017 | Starke | H01Q 1/36 |
| 2007/0042170 A1* | 2/2007 | Morin | H01B 3/48 |
| | | | 428/221 |
| 2011/0158807 A1 | 6/2011 | Hong | |
| 2012/0163981 A1 | 6/2012 | Hong | |
| 2014/0118196 A1* | 5/2014 | Koskiniemi | H01Q 21/205 |
| | | | 343/702 |
| 2016/0116948 A1 | 4/2016 | Ou et al. | |
| 2017/0368764 A1 | 12/2017 | Busby et al. | |
| 2018/0002530 A1 | 1/2018 | Hong | |
| 2018/0222630 A1 | 8/2018 | Takemoto | |
| 2020/0262958 A1 | 8/2020 | Yutaro | |

FOREIGN PATENT DOCUMENTS

| | | |
|---|---|---|
| EP | 3 038 331 A1 | 6/2016 |
| JP | 7-283638 A | 10/1995 |
| JP | 2005-333273 A | 12/2005 |
| JP | 2013-102512 A | 5/2013 |
| JP | 2014-523523 A | 9/2014 |
| JP | 2014-195231 A | 10/2014 |
| JP | 2015-139211 A | 7/2015 |
| JP | 2016-223948 A | 12/2016 |
| KR | 10-2015-0100093 | 9/2015 |
| WO | WO 2007/021611 A1 | 2/2007 |
| WO | WO 2017/056341 A1 | 4/2017 |
| WO | WO 2017/104715 A1 | 6/2017 |

OTHER PUBLICATIONS

International Search Report, PCT/ISA/210, dated May 21, 2019, in corresponding International Patent Application No. PCT/JP2019/008974.
Written Opinion of International Searching Authority, PCT/ISA,237, dated May 21, 2019, in corresponding International Patent Application No. PCT/JP2019/008974.
Extended European Search Report dated Oct. 22, 2021, in European Application No. 19763422.3.

* cited by examiner

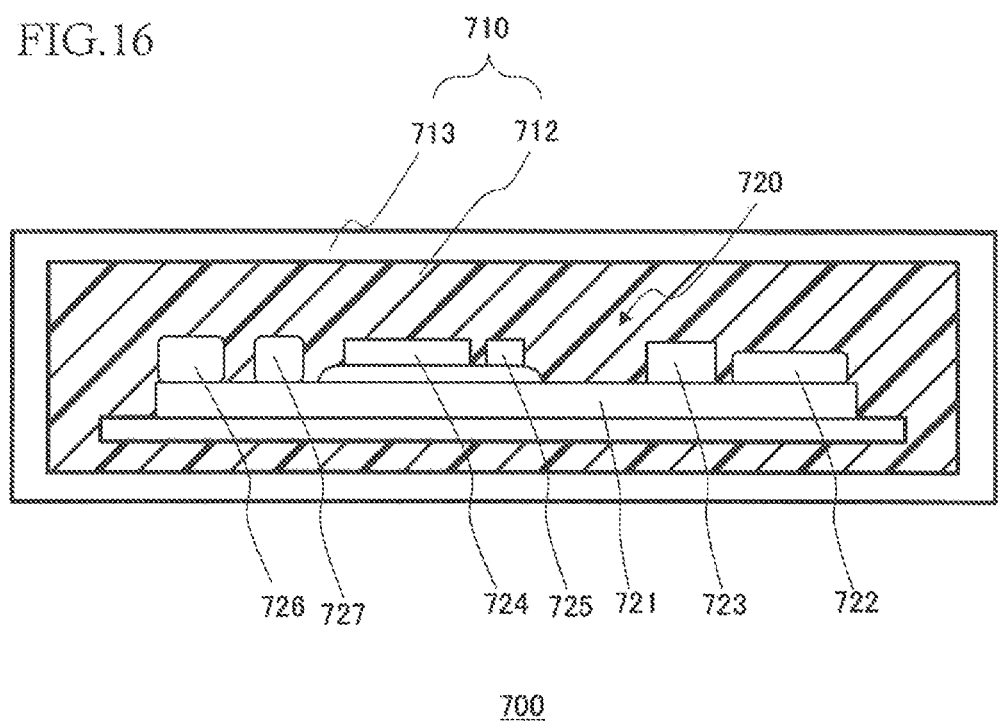

PROTECTIVE MATERIAL AND WIRELESS COMMUNICATION DEVICE

CROSS-REFERENCE TO RELATED APPLICATIONS

This application is a U.S. National Stage Application which claims the benefit under 35 U.S.C. § 371 of International Patent Application No. PCT/JP2019/008974 filed on Mar. 6, 2019, which claims foreign priority benefit under 35 U.S.C. § 119 of Japanese Patent Application No. 2018-039833 filed on Mar. 6, 2018, in the Japan Intellectual Property Office, the contents of both of which are incorporated herein by reference.

TECHNICAL FIELD

The present invention relates to protective materials and wireless communication devices.

Protective materials for protecting wireless communication devices are known. For example, radomes are known to protect the antenna from natural environments. The radome prevents human contact by visually concealing antennas and electronic equipment. It is known that by bringing the dielectric constant εr of the material of the radome closer to 1.0 which is the relative dielectric constant εr of the surrounding air, the effect on the electromagnetic field in the vicinity of the antenna is reduced (see, e.g., Patent Document 1). Patent Document 1 lists polystyrene foam containing a large amount of layer of air as a material of such low dielectric constant. However, according to Patent Document 1, polystyrene foam is impractical as a substrate for a radome due to lack of strength. Furthermore, Patent Document 1 also reports that a laminated structure, in which the equivalent dielectric constant εr is lowered by attaching a resin layer having a dielctric constant εr larger than the air dielectric constant εr but having a high strength on both side surfaces of the foamed polystyrene, is also impractical. Patent Document 1 proposes to form the radome with a copolymerized synthetic resin of the acrylonitrile-butadiene-styrene (ABS system). The following Patent Documents 2 to 7 are known as techniques related to the embodiments described herein.

PRIOR ART DOCUMENTS

Patent Documents

[Patent Document 1] Japanese Patent Application Publication No. 1995-283638A
[Patent Document 2] Japanese Patent Application Publication No. 2014-195231A
[Patent Document 3] Japanese Patent Application Publication No. 2016-223948A
[Patent Document 4] Japanese Patent Application Publication No. 2015-139211A
[Patent Document 5] International Publication No. 2007/021611A
[Patent Document 6] Japanese Patent Application Publication No. 2013-102512A
[Patent Document 7] Japanese Patent Application Publication No. 2005-333273A

Problem to be Solved

Preferably, the protective material is light weight and high strength, and electromagnetic waves is easily transmitted through it.

General Disclosure

In a first aspect of the invention, a protective material is provided. The protective material may protect the wireless communication portion for wireless communication. The protective material may comprise a substrate. The substrate may be formed of a foam synthetic resin. The protective material may comprise a coating layer. The coating layer may comprise a polyurea resin. The coating layer may cover at least a front side surface of the substrate. The wireless communication portion may include an antenna portion. The protective material may be a radome that protects the antenna portion.

The coating layer may be provided on both the front side surface and a back side surface of the substrate. A thickness of the coating layer provided on the back side surface of the substrate may be larger than the thickness of the coating layer provided on the front side surface of the substrate.

The thickness of the coating layer of a portion which is provided in a direction in which the wireless communication portion transmits or receives radio waves may be less than the thickness of the coating layer of other portion.

A through hole may be formed in the coating layer of the back side surface in the direction in which the wireless communication portion transmits or receives the radio waves.

The protective material may be formed in a tubular shape. A side surface direction of the tubular shape may be a direction in which the wireless communication portion transmits or receives the radio waves.

The dielectric constant εr of the coating layer may be 2 or more and 4 or less.

A foam ratio of the substrate may be 50 times or more. The thickness of the substrate may be 1 mm or more and 5 cm or less. The thickness of the coating layer is 0.1 mm or more and 0.5 mm or less.

The polyurea resin may be mixed with a polyisocyanate compound and a synthetic resin. A volume ratio of the polyisocyanate compound to the synthetic resin may be 1:0.5 to 1:1.5.

The polyurea resin may contain polytetrafluoroethylene or hexagonal boron nitride.

The polyurea resin may be supplemented with at least one of 2, 2-bis(3-amino-4-methylphenyl) hexafluoropropane and bis(γ-aminopropyl) tetramethyldisiloxane.

In a second aspect of the present invention, a wireless communication device is provided. The wireless communication device may include a wireless communication portion for wireless communication. The wireless communication device may comprise the protective material described above. The wireless communication portion may include a parabolic type or dipole type antenna portion.

The wireless communication device may be a base station antenna device for communicating with the wireless communication terminal. The wireless communication device may be an in-vehicle antenna device. The antenna device may be a wireless tag device. The wireless communication device may be an IoT (Internet of Things) communication module. The wireless communication portion may be surrounded by the protective material.

It should be noted that the summary of the above invention does not list all the necessary features of the invention. Subcombinations of these groups of features may also be inventions.

BRIEF DESCRIPTION OF DRAWINGS

FIG. 16 illustrates an example of the IoT communication module 700 comprising the protective material 710 according to a twelfth embodiment of the present invention.

EMBODIMENTS FOR CARRYING OUT THE INVENTION

Although the invention will be described below through embodiments of the invention, the following embodiments are not intended to limit the claimed invention. Also, not all of the combinations of features described in the embodiments are essential to the solution of the invention.

Figure 1:
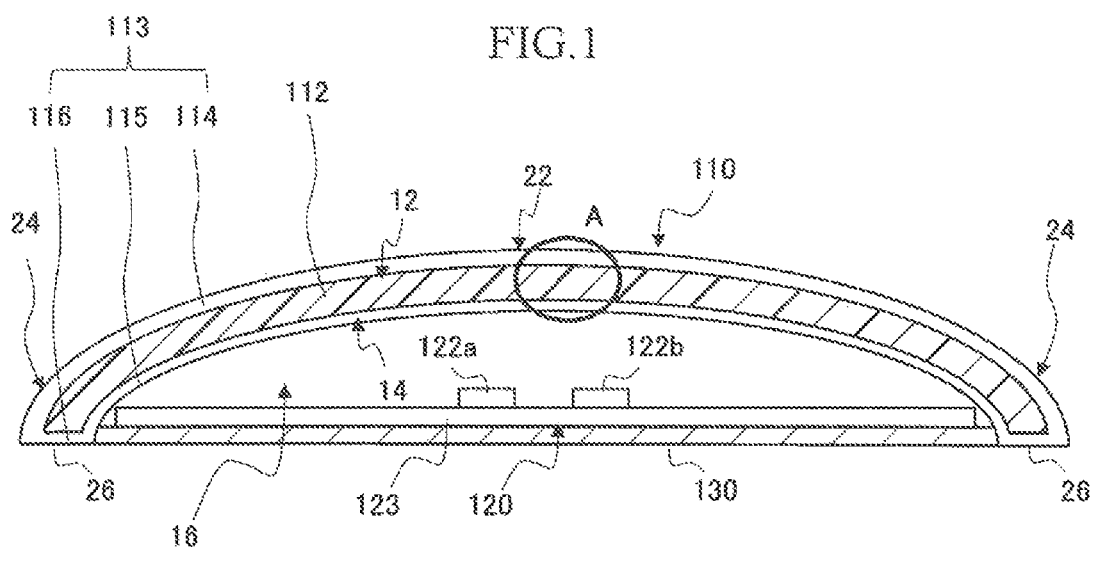
FIG. 1 is a cross-sectional view illustrating an example of a wireless communication device 100 comprising a radome 110 according to a first embodiment of the present invention.

FIG. 1 is a cross-sectional view illustrating an example of a wireless communication device 100 comprising a radome 110 according to a first embodiment of the present invention. The radome 110 is an example of a protective material that protects the wireless communication portion. The wireless communication device 100 includes the radome 110 and a wireless communication portion 120. FIG. 1 schematically illustrates the wireless communication portion 120. The wireless communication portion 120 communicates wirelessly. The wireless communication portion 120 is a body portion of the wireless communication device 100. The wireless communication portion 120 includes an antenna portion 122 for transmitting or receiving radio waves. In this example, the wireless communication portion 120 includes a radiating elements 122a and 122b as the antenna portion 122. The radiating elements 122a, 120b may be one or more. In this example, the wireless communication portion 120 includes a plurality of radiating elements 122a and 122b as the antenna portion 122.

The wireless communication portion 120 may include a circuit board 123 for controlling the antenna portion 122 and an actuator for adjusting the angle of the radiating elements. The configuration of the wireless communication portion 120 is the same as that of a conventional wireless communication device 100. Therefore, the detailed explanation is omitted.

The frequency band of the wireless communication portion 120 transmitted or received may, in one example, be appropriately determined within the range of 500 MHz or more to 100 GHz or less. In particular, the frequency band of the radio wave may be any range selected from the frequency band of the millimeter band (range from 30 GHz or more to 100 GHz or less) used in the fifth generation communication system (5G) or any range selected from the frequency band of the quasi-millimeter wave (range from 20 GHz or more to less than 30 GHz or the like).

The radome 110 shown in FIG. 1 may have a convex shape projecting from the back side surface 14 to the front side surface 12. In this example, the radome 110 is in the shape of a cup. The radome 110 includes a substrate 112 and a coating layer 113. The substrate 112 is formed of a foam synthetic resin. The substrate 112 is formed to surround the wireless communication portion 120. The substrate 112 corresponds to the shape of the radome 110. The substrate 112 determines the shape of the radome 110. In this example, the substrate 112 has a convex shape such that it protrudes from the back side surface 14 to the front side surface 12.

The radome 110 may have a top surface 22 and a side surface 24 that descends outwardly from the periphery of the top surface 22. If the radome 110 is a radome for an antenna mounted on an aircraft or the like, the substrate 112 in the shape of the radome 110 may have a streamlined shape to reduce air resistance. In this case, the substrate 112 is formed such that the top surface 22 and the side surface 24 are continuous and smooth.

The wireless communication device 100 may include a bottom portion 130. The ends of the side surface 24 of the radome 110 may be secured to the bottom portion 130. The manner in which the radome 110 is secured may be similar to conventional methods. The bottom portion 130 may support the wireless communication portion 120. In this example, the housing space 16 is formed between the radome 110 and the bottom portion 130 by the substrate 112 having a convex shape projecting from the back side surface 14 to the front side surface 12. The housing space 16 includes the wireless communication portion 120. However, the shape of the radome 110 is not limited to the case shown in FIG. 1.

If the radome 110 is not a radome for an antenna mounted on an aircraft or the like, there is no need to reduce air resistance. Thus, the top surface 22 may be flat. The side surface 24 may extend from the edge of the top surface 22 in a direction intersecting the top surface 22. In one example, the wireless communication portion 120 may have a planar antenna and the radome 110 may be formed in a rectangular shape to accommodate the planar antenna.

The coating layer 113 is formed of a polyurea resin. The coating layer 113 covers at least the front side surface 12 of the substrate 112. In the example shown in FIG. 1, the coating layer 113 is provided on both the front side surface 12 and the back side surface 14 of the substrate 112. In particular, the coating layer 113 may be formed on the entire surface of the substrate 112. That is, the coating layer 113 may include a coating front surface portion 114, a coating back surface portion 115, and a coating end surface portion 116. The coating front surface portion 114 is a coating layer 113 provided on the front side surface 12 of the substrate 112. The coating back surface portion 115 is a coating layer 113 provided on the back side surface 14 of the substrate 112. The coating end surface portion 116 is a coating layer 113 provided on the side surface of the substrate 112. The end surface refers to the surface between the front side surface 12 and the back side surface 14. In this example, the end surface corresponds to the end surface 26 of the radome 110.

In this example, the substrate 112 is covered also at the end surface 26 of the radome 110 by the coating layer 113, and the peeling of the coating layer 113 is prevented from progressing from the end surface 26. Also, it is possible that the coating layer 113 formed on the front side surface 12, the back side surface 14, and the end surface 26 of the substrate 112 are interconnected to provide sufficient strength to the radome 110. However, the coating layer 113 is not limited to the coating layer that covers both the front side surface and the back side surface of the substrate 112, as will be described below.

Figure 2:
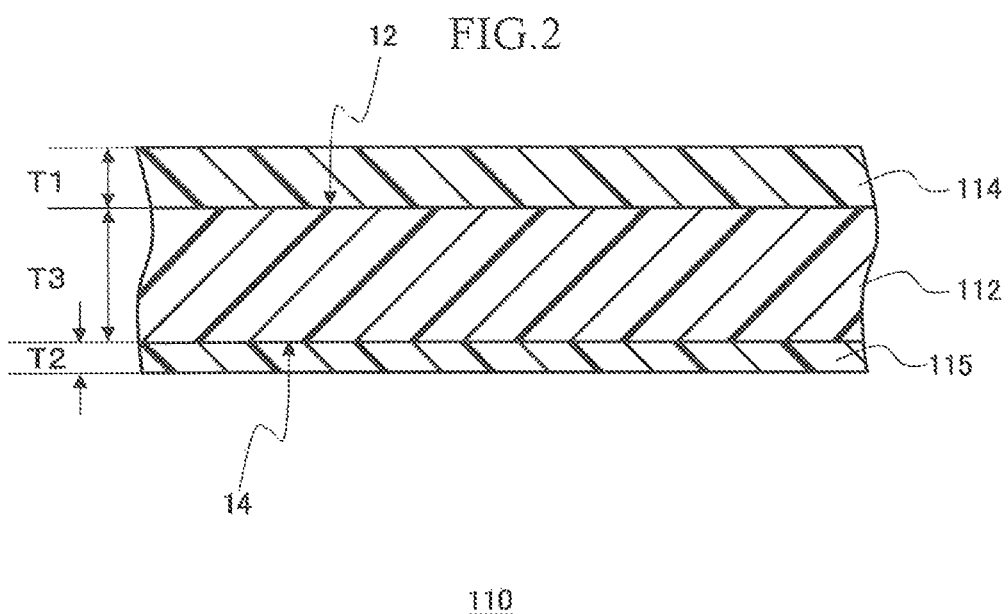
FIG. 2 shows a partial cross-section of the radome 110.

FIG. 2 is a view illustrating a partial cross-section of the radome 110. FIG. 2 enlarges the A portion of FIG. 1. The substrate 112 is formed of a foam synthetic resin. In FIG. 2, the thickness T1 of the coating front surface portion 114 and the thickness T2 of the coating back surface portion 115 are exaggeratedly shown in the coating layer 113.

As an example, the synthetic resin forming the substrate 112 is a high polymer compound. As a more specific example, the synthetic resin forming the substrate 112 is formed of one or more materials selected from polystyrene, polyethylene, polypropylene, and polyurethane. Foam synthetic resins are those made of fine bubbles dispersed in these synthetic resins. In one embodiment, the substrate 112 is formed of foamed polystyrene (polystyrene foam).

The coating layer 113 is formed of a polyurea resin. The polyurea resin is a resin having a urea bond formed, for example, by chemical reaction of an isocyanate with an amino group. As an example, the polyurea resin is formed by reacting the polyisocyanate with the polyamine. The polyurea resin may have a volume ratio of 1:0.5 to 1:1.5 between a polyisocyanate compound having a specific gravity of 1.09 to 1.12 and a synthetic resin as a curing agent having a specific gravity of 1.13 to 1.02. In this example, the ratio of mixing a polyisocyanate compound with a synthetic resin (Resin) as a curing agent is 1:1 and the weight ratio is about 109:100. This allows the dielectric constant of the coating layer 113 to be 3.0 or more to 4.0 or less, for example 3.5. The dielectric tangent (tan δ) may be from 0.015 or more to 0.035 or less. For example, the dielectric tangent (tan δ) is 0.03.

The higher the volume ratio of the synthetic resin to the polyisocyanate compound is, the higher the dielectric constant εr is. For example, if the volume ratio of a polyisocyanate compound to a synthetic resin as a curing agent is 1:2, the dielectric constant εr may be greater than 5. Therefore, it is desirable to set the dielectric constant εr to be 3 or more to 4 or less by setting the volume ratio to the synthetic resin as the curing agent to be 1:1.5 or less. On the other hand, if the volume ratio of the polyurea resin as the curing agent is less than 1:0.5, it may be difficult to cure the polyurea resin sufficiently. Therefore, it is desirable that the volume ratio of the polyurea resin to the synthetic resin as the curing agent is not less than 1:0.5 so that the polyurea resin is sufficiently cured.

The polyurea resin may also be supplemented with at least one of 2, 2-bis(3-amino-4-methylphenyl) hexafluoropropane and bis(γ-aminopropyl)tetramethyldisiloxane. These additives can lower the dielectric constant of the coating layer 113 compared to the case of the absence of the additive. For example, the dielectric constant can be from 2.0 or more to 4.0 or less, more preferably from 2.0 or more to 3.0 or less, depending on the additive.

In this example, the coating layer 113 is formed on the entire surface of the substrate 112. However, the coating layer 113 may not be provided at a portion where a fastener for attaching the radome 110 to a member such as a bottom portion 130 is provided. However, the coating layer 113 may also be formed on the surface of the fastener provided in the radome 110.

The thickness of the coating layer 113 is less than the thickness T3 of the substrate 112. Specifically, the thickness T1 of the coating front surface portion 114 and the thickness T2 of the coating back surface portion 115 are smaller than the thickness T3 of the substrate 112, respectively. The coating layer 113, such as the coating front surface portion 114 and the coating back surface portion 115, may have a dielectric constant εr of 2 or more to 4 or less as described above. The dielectric constant εr of the coating layer 113 in this example is 3.5±0.2. However, in the case that the additive described above is contained in a polyurea resin, the coating layer 113 having a specific dielectric constant εr between 2.0 or more and 3.0 or less may be used.

The dielectric constant εr of the coating layer 113 is higher than the dielectric constant εr of the substrate 112. Accordingly, the lower the thickness (T1, T2) of the coating layer 113 relative to the thickness T3 of the substrate 112 is, the lower the dielectric constant εr of the entire radome 110 can be. In this example, the thickness T1 of the coating front surface portion 114 may be larger than the thickness T2 of the coating back surface portion 115. T2 may be equal to or less than ½ of T1 and may be equal to or less than ⅒ of T1. Thus, the thickness T1 of the coating front surface portion 114 can be secured for protecting the wireless communication 120 from the natural environment and the loss of radio waves can be reduced by reducing the thickness T2 of the coating back surface portion 115. However, the thickness T1 of the coating front surface portion 114 may be the same as the thickness T2 of the coating back surface portion 115.

In order to reduce the loss of radio waves due to the entire radome 110, it is desirable to reduce the thickness of the coating layer 113, in particular the thickness T1 of the coating front surface portion 114 and the thickness T2 of the coating back surface portion 115, respectively. The thickness T1 of the coating front surface portion 114 and the thickness T2 of the coating back surface portion 115 may be 5 mm or less, respectively, and preferably 2 mm or less. More preferably, T1 and T2 may be from 0.1 mm or more to 0.5 mm or less, respectively.

In a configuration in which the coating front surface portion 114 and the coating back surface portion 115 are connected at the coating end surface portion 116, the distance between the coating front surface portion 114 coating the front side surface 12 and the coating back surface portion 115 can be increased by increasing the thickness T3 of the substrate 112, thereby the strength of the entire radome 110 can be ensured even when the thickness (T1, T2) of the coating layer 113 is reduced.

Figure 3:
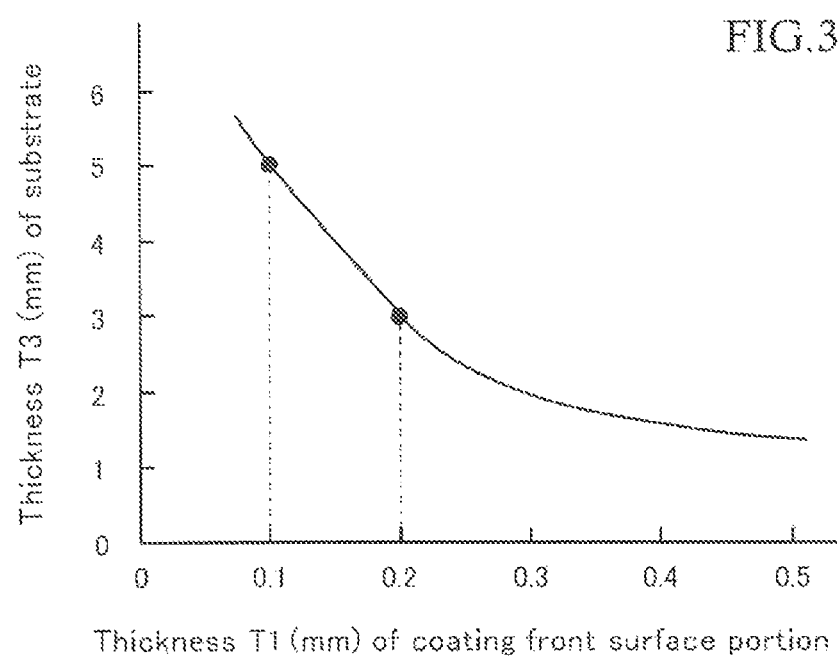
FIG. 3 is a diagram illustrating the relationship between the thickness of the substrate 112 which sets the strength of the entire radome 110 to be a specified value and the thickness of the coating layer 113.

FIG. 3 is a diagram illustrating the relationship between the thickness of the substrate 112 which sets the strength of the entire radome 110 to be a specified value and the thickness of the coating layer 113. The specified value of strength may be arbitrarily determined by the specification of the radome 110. In this example, the thickness T2 of the coating back surface portion 115 of the coating layer 113 is set to be constant at 0.1 mm. The longitudinal axis of FIG. 3 shows the thickness T3 (mm) of the substrate 112, and the horizontal axis of FIG. 3 shows the thickness T1 (mm) of the coating front surface portion 114. According to FIG. 3, even if the thickness of the coating layer 113 (the thickness T1 of the coating front surface portion 114 in FIG. 3) is 0.2 mm or less, the strength of the radome 110 can be set to be more than the specified value by increasing the thickness T3 of the substrate 112. As the thickness T1 of the coating front surface portion 114 increases, the thickness T3 of the substrate 112 needs to be reduced to ensure the strength of the radome 110. However, in order to secure the strength of the radome 110, the thickness T1 of the coating front surface portion 114 has a lower limit. The thickness T1 of the coating front surface portion 114 is preferably 0.1 mm or more. Further, it is desirable that the thickness T3 of the substrate 112 is 1 mm or more. The thickness T3 of the substrate 112 may be 1 mm or more to 50 mm or less, or 10 mm or more to 10 mm or less. The lower limit of the thickness T3 of the substrate 112 may be determined from a view of securing the strength of the entire radome 110 and from constraints in the manufacturing process. An upper limit of the thickness of the substrate 112 may be determined depending on the product specification of the radome.

Figure 4:
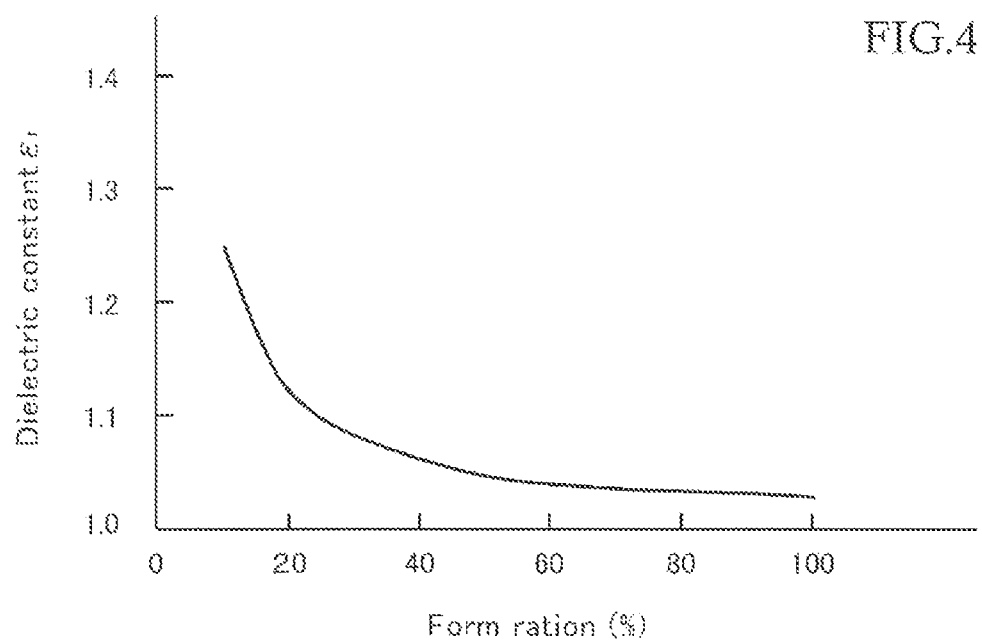
FIG. 4 is a diagram illustrating a relationship between the foam ratio of the substrate 112 and the dielectric constant εr of the substrate 112.

FIG. 4 shows the relationship between the foam ratio of the substrate 112 and the specific dielectric constant εr of the substrate 112. The horizontal axis in FIG. 4 is the foam ratio X (%), and the vertical axis is the dielectric constant εr of the substrate 112. The foam ratio refers, for example, to the expansion ratio (volume ratio) when a grain of a synthetic resin (raw material bead) is heated to expand with steam or the like. More specifically, in 50 times foams, 98% of the total substrate (volume) is air, and 2% is synthetic resin. In the example shown in FIG. 4, a foamed polystyrene (polystyrene foam) is used as the substrate 112.

The dielectric constant εr of polystyrene used as a synthetic resin is 2.5 and the dielectric constant εr of air is 1.0. The higher the foam ratio X (%) is, the greater the proportion of air in the volume of the substrate 112 increases. Accordingly, the higher the foam ratio X (%) is, the lower the dielectric constant εr of the foamed polystyrene becomes and the dielectric constant εr of the foamed polystyrene is approaching to 1 which is the dielectric constant εr of air. Assuming that the dielectric constant εr of the synthetic resin is C (2.5 for the case of polystyrene) and the foam ratio is X (%), the dielectric constant εr is calculated by the equation εr=1+C/X. As shown in FIG. 4, when a synthetic resin with a dielectric constant εr of 2 or more to 3 or less is used, the dielectric constant εr can be 1.1 or less by setting the foam ratio to be 30 or more. When the foam ratio is set to be 50 times or more, the dielectric constant εr can be 1.05 or less. Accordingly, it is preferable that the foam ratio of the foam synthetic resin is 30 times or more, and more preferably 50 times or more.

The substrate 112 is very lightweight because it is formed of a foam synthetic resin. Also, since the coating layer 113 is formed of polyurea resin, it has high strength, excellent water resistance, and excellent impact resistance. Accordingly, even if the coating layer 113 is 5 mm or less, preferably 1 mm or less, the wireless communication portion 120 can be protected.

The following table compares the radome 110 of the embodiment with the radome of the comparative example. The radome of the comparative example was in the same shape as the radome 110 of FIG. 1. However, the radome of the comparative example was formed of glass fiber reinforced resin in contrast to the radome 110 of the present embodiment. In the radome 110 of the present embodiment, the foam ratio of the foam synthetic resin of the substrate 112 was 50 times. The thickness T3 of the substrate 112 was 5 mm. However, the thickness T3 of the substrate 112 may be 5 mm or more, or 10 mm or more. In the radome 110 of the present embodiment, the thickness of the coating layer 113 was set to be 2 mm. In this example, the thickness T1 of the coating front surface portion 114 is set to be 2 mm, and the thickness T2 of the coating back surface portion 115 is set to be 2 mm. The dielectric constant εr indicates the value for the radio wave with a center frequency of 5.6 GHz. The dielectric constant εr was measured by the measuring method specified in ASTM D150.

TABLE 1

|  | Comparative example | Present embodiment |
| --- | --- | --- |
| Loss by redome(%) | about 25% | about 6% |
| Weight | about 100 kg | about 3 kg |
| Material | Glass fiber reinforced resin | Both front side and back side surfaces of substrate of foamed polystyrene are covered by coating layer of polyurea resin |
| Dielectric constant εr(specified in ASTM D150) | 4.6 | Substrate: 1.05 Coating layer (thickness 2 mm): 3.5 |
| Specific gravity | 2 | about 0.1 |

The loss of radio waves in the radome 110 of the embodiment shown in Table 1 was less than one-fourth of the loss of radio waves in the radome of the comparative example formed of glass fiber reinforced resin of the same shape. Specifically, the penetration loss in the radome 110 of the present embodiment was 0.4 dB when the central frequency of the radio wave was 5.6 GHz (5.6 GHz band), and the penetration loss in the radome of the comparison example was 1.5 dB in the 5.6 GHz band. Thus, in the 5.6 GHz band, the penetration loss in the radome 110 of this example was reduced by 1.1 dB for the penetration loss in the comparative example. Such penetration loss can be reduced in other wavelength bands.

The loss (permeation loss) increases with increasing of the dielectric constant εr. In the example shown in Table 1, the thickness T1 of the coating front surface portion 114 is 2 mm and the thickness T2 of the coating back surface portion 115 is 2 mm. The loss can be reduced by further lowering the dielectric constant εr with reducing the thickness T1 and T2 to be 1 mm or less, preferably to be 0.1 mm or more to 0.5 mm or less. In particular, by making the thickness T1 of the coating front surface portion 114 larger than the thickness T2 of the coating back surface portion 115, the portion of the coating layer 113 exposed externally can be thickened to protect the wireless communication portion 120 from the natural environment and also the loss of radio waves can be reduced by decreasing the thickness T2 of the coating back surface portion 115.

In particular, the thickness T2 of the substrate 112 may be, for example, 10 mm or more, if permitted in the specification of the outer dimensions of the radome 110. By setting the distance between the coating layer 113 covering the front side surface 12 and the coating layer 113 covering the back side surface 14 to be greater than or equal to 10 mm, the overall strength of the radome 110 computationally based on structural dynamics may be increased. By increasing the strength of the entire radome 110 and setting the thickness T1 of the coating layer 113 to be 0.1 mm or moe to 0.5 mm or less, the loss of the entire radome 110 can be reduced.

Figure 5:
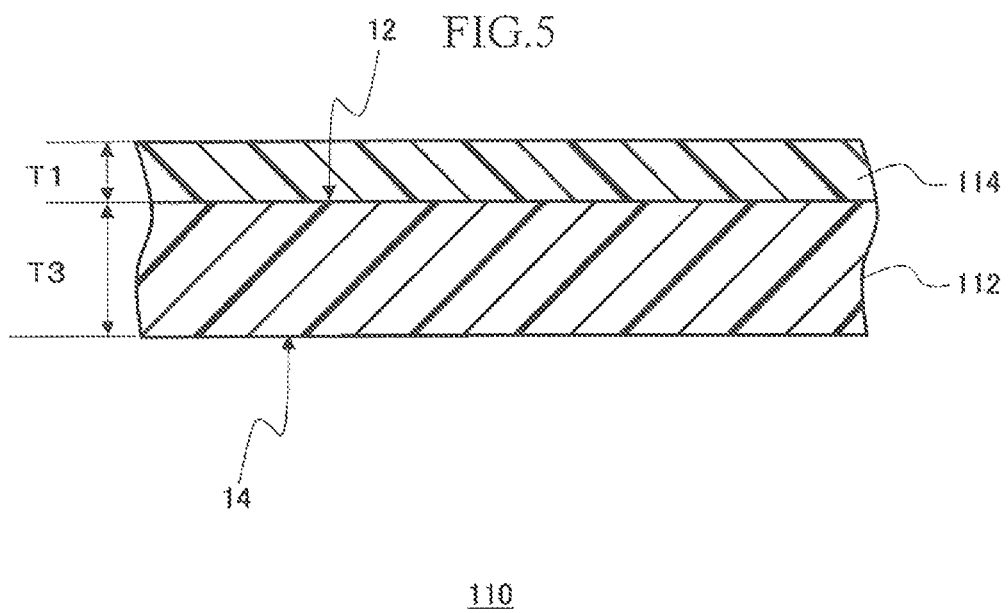
FIG. 5 is a view illustrating a partial cross-section of the radome 110 according to a second embodiment.

FIG. 5 is a view illustrating a partial cross-section of a radome 110 according to a second embodiment. The radome 110 of the second embodiment includes a coating layer 113 covering the front side surface of the substrate 112. The coating layer 113 includes a polyurea resin. The coating layer 113 includes a coating front surface portion 114. However, in this embodiment, the coating layer 113 does not include a coating back surface portion 115 and a coating end surface portion 116. In other words, the coating layer 113 is provided on the front side surface 12 of the substrate 112 and is not provided on the back side surface 14 of the substrate 112. Except in this respect, the radome 110 of the second embodiment is similar to the structure of the radome 110 of the first embodiment. Therefore, repetitive explanations are omitted.

According to the radome 110 of the second embodiment, multiple reflections of radio waves between the coating front surface portion 114 and the coating back surface portion 115 prevent interference or the like from occurring. Also, the overall thickness of the coating layer 113 is reduced because the coating back surface portion 115 is omitted. Therefore, the loss of radio waves can be reduced.

Figure 6:
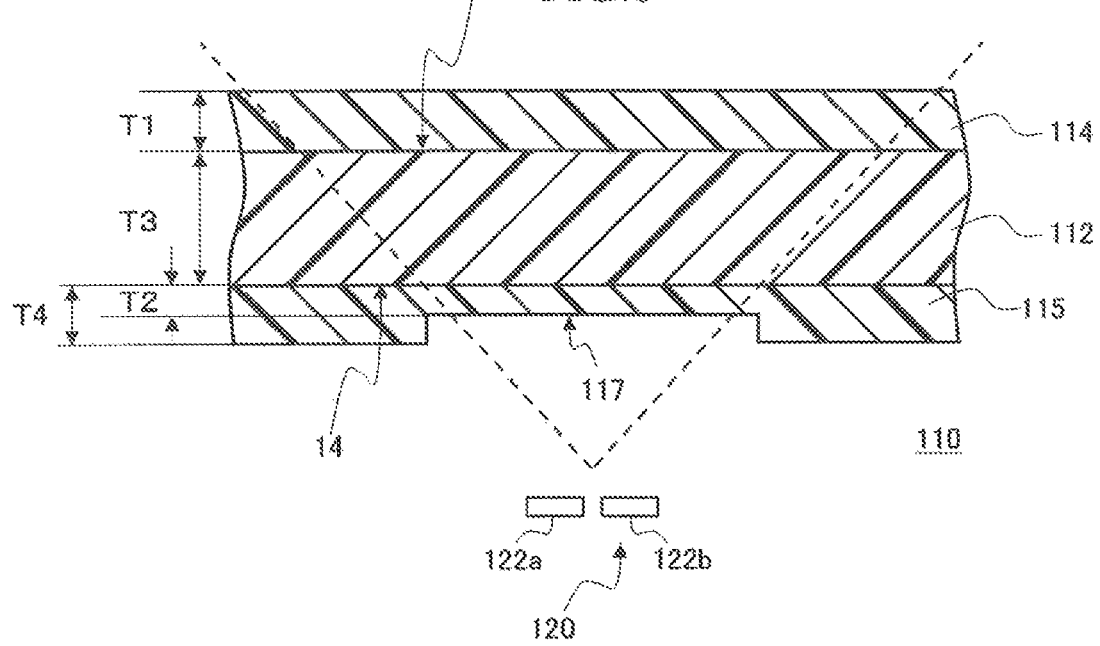
FIG. 6 is a view illustrating a partial cross-section of the radome 110 according to a third embodiment.

FIG. 6 is a view illustrating a partial cross-section of a radome 110 according to a third embodiment. The radome 110 of the third embodiment includes a substrate 112 and a coating layer 113. The coating layer 113 includes a coating front surface portion 114, a coating back surface portion 115, and a coating end surface portion 116. Accordingly, in this example, the coating layer 113 is provided on both the front side surface and the back side surface of the substrate. FIG. 6 shows the coating front surface portion 114 and the coating back surface portion 115.

In this example, the thickness of the portion of the coating layer 113, which is provided in the direction in which the wireless communication portion 120 transmits or receives radio waves, is less than the thickness of the other portion of the coating layer 113. In this example, a range sandwiched between dotted lines indicates a range of directivity of the wireless communication portion 120. The range of the directionality of the wireless communication portion 120 corresponds to the direction in which the wireless communication portion 120 transmits or receives radio waves. In this example, the thickness T1 of the coating front surface portion 114 of the coating layer 113 is constant regardless of the directivity range of the wireless communication portion 120.

On the other hand, the coating back surface portion 115 differs in thickness corresponding to the range of directivity of the radio waves transmitted and received from the wireless communication portion 120. The coating back surface portion 115 includes a transmission portion 117 in the direction in which the wireless communication portion 120 transmits or receives radio waves. The thickness T2 of the transmission portion 117 is less than the thickness T4 of the portion other than the transmission portion 117 of the coating back surface portion 115. In this example, a transmission portion 117 is provided in the portion of the coating back surface portion 115 corresponding to the antenna portion 122 of the wireless communication portion 120. The thickness T2 of the transmission portion 117 may be less than ⅔ of the T4, may be less than ½, and may be less than ⅓.

The thickness T2 of the transmission portion 117 may be less than the thickness T1 of the coating front surface portion 114. The thickness T4 of the portions other than the transmission portion 117 of the coating back surface portion 115 may be the same as or different from the thickness T1 of the coating front surface portion 114. The thickness of the coating layer 113 may have the same structure as in the first and second embodiments, except that the thickness is reduced in the direction of transmitting or receiving radio waves. Therefore, repetitive explanations are omitted.

The location where the transmission portion 117 is provided may be different from that shown in FIG. 6. Specifically, the transmission portion 117 may be provided on the coating front surface portion 114. Also, both the coating front surface portion 114 and the coating back surface portion 115 may be provided with the transmission portion 117. Also, in the example shown in FIG. 6, the thickness T2 of the transmission portion 117 is constant. However, the thickness T2 of the transmission portion 117 may be formed to periodically increase or decrease in the surface direction. In this case, multiple reflections in the transmission portion 117 can be prevented.

According to the radome 110 of the third embodiment, in the direction in which the wireless communication portion 120 transmits or receives radio waves, the loss of radio waves is reduced by thinning the thickness of the coating layer 113 than that of the other portions, while in other directions, the thickness of the coating layer 113 is sufficiently secured to enhance the strength of the radome 110.

Figure 7:
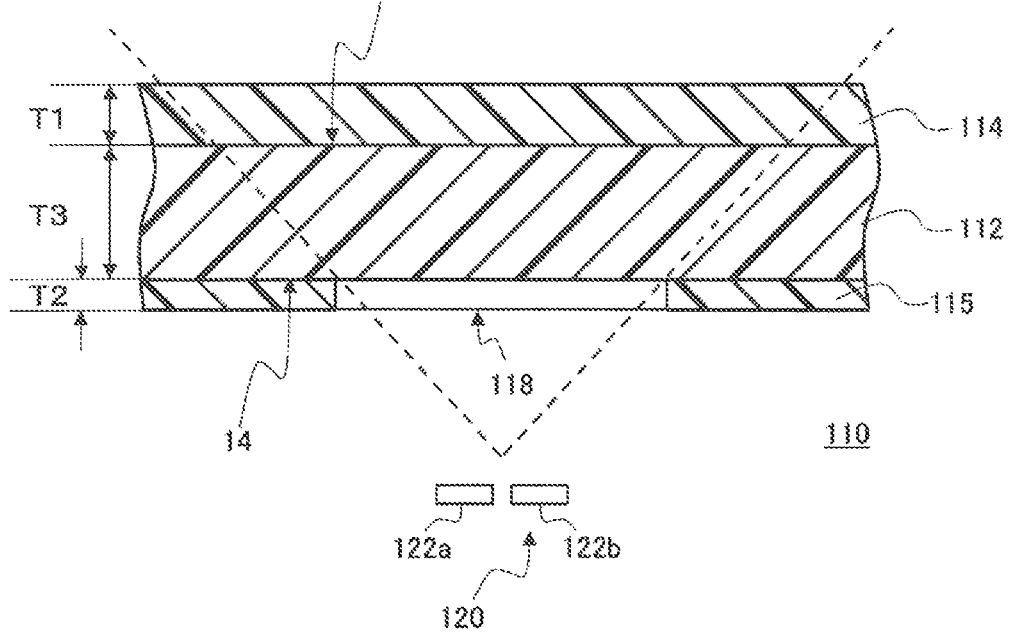
FIG. 7 shows a partial cross-section of the radome 110 according to a fourth embodiment.

FIG. 7 is a view illustrating a partial cross-section of a radome 110 according to a fourth embodiment. The radome 110 of the fourth embodiment includes a substrate 112 and a coating layer 113. The coating layer 113 includes a coating front surface portion 114, a coating back surface portion 115, and a coating end surface portion 116. That is, in the present embodiment, the coating layer 113 is provided on both the front side surface and the back side surface of the substrate.

In this embodiment, the coating layer 113 has a through hole 118 formed in the coating back surface portion 115 provided on the back side surface 14 of the substrate 112. The back side surface 14 of the substrate 112 in the area of the through hole 118 is not covered by the coating back surface portion 115 which is a polyurea resin. The area of the through hole 118 is exposed on the back side surface 14 of the substrate 112. The radome 110 according to the fourth embodiment has a structure similar to that of the radome 110 according to the first embodiment, except that the through hole 118 is formed in the coating back surface portion 115. Accordingly, repetitive descriptions will be omitted and the same member numbers will be used for similar members.

According to the radome 110 of the fourth embodiment, in the direction in which the wireless communication portion 120 transmits or receives radio waves, the through hole 118 is formed in the coating back surface portion 115. Accordingly, since the coating back surface portion 115 is omitted, the loss of the radio waves can be reduced. On the other hand, in a direction other than the direction in which the wireless communication portion 120 transmits or receives radio waves, the coating layer 113 is provided. At the end surface 26 of the radome 110, the substrate 112 is covered by the coating layer 113 to prevent peeling of the coating layer 113 from advancing from the end surface 26. The strength of the radome 110 can also be increased.

Figure 8:
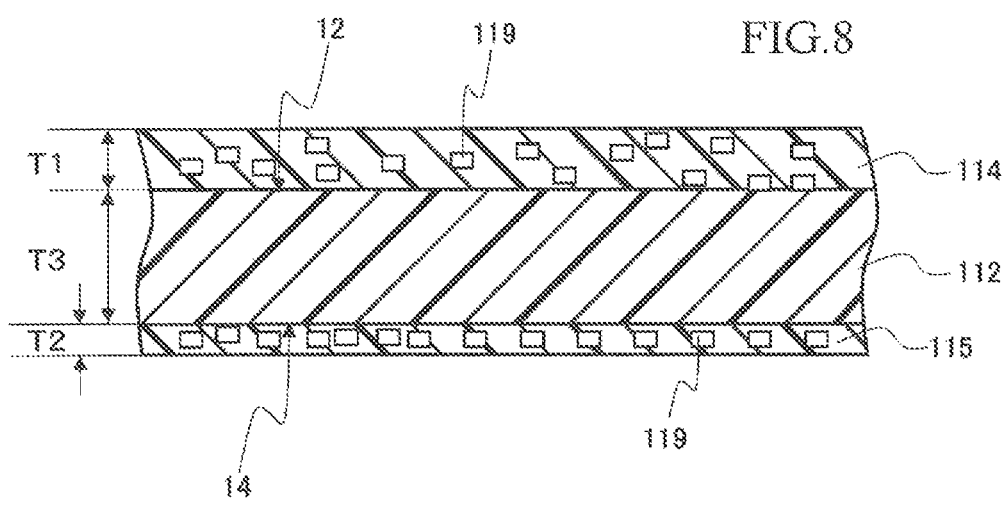
FIG. 8 shows a partial cross-section of the radome 110 according to a fifth embodiment.

FIG. 8 is a view illustrating a partial cross-section of a radome 110 according to a fifth embodiment. The radome 110 of the fifth embodiment includes a substrate 112 and a coating layer 113. The coating layer 113 may include a coating front surface portion 114, a coating back surface portion 115, and a coating end surface portion 116. However, the coating back surface portion 115 may be omitted. In the radome 110 of this embodiment, the coating layer 113 comprises a polyurea resin. The polyurea resin may contain polytetrafluoroethylene (PTFE) or hexagonal boron nitride as a content 119. FIG. 8 schematically illustrates a polyurea resin of coating layer 113 comprising the content 119.

The polytetrafluoroethylene (PTFE) may have an average particle size of 0.1 µm or more to 10 µm or less. The hexagonal boron nitride may have an average particle size from 1 µm or more to 100 µm or less. Mean particle size may mean the 50% particle size (D50: median diameter) measured by the laser diffraction scattering method. By increasing the percentage of the content 119, the dielectric constant can be reduced from 3.5 to 3.0 or less. However, if the ratio of the content 119 is too large, the strength of the entire coating layer 113 is reduced. Accordingly, the polytetrafluoroethylene (PTFE) may comprise 10 to 30 parts by weight relative to 100 parts by weight of the polyurea resin in the coating layer 113. Alternatively, the hexagonal boron nitride may comprise 20 to 40 parts by weight relative to 100 parts by weight of the polyurea resin in the coating layer 113.

Except that the polyurea resin in the coating layer 113 contains polytetrafluoroethylene (PTFE) or hexagonal boron nitride, the radome 110 according to the fifth embodiment may have the same structure as the radome 110 according to the first to fourth embodiments. Therefore, repetitive explanations are omitted.

Figure 9:
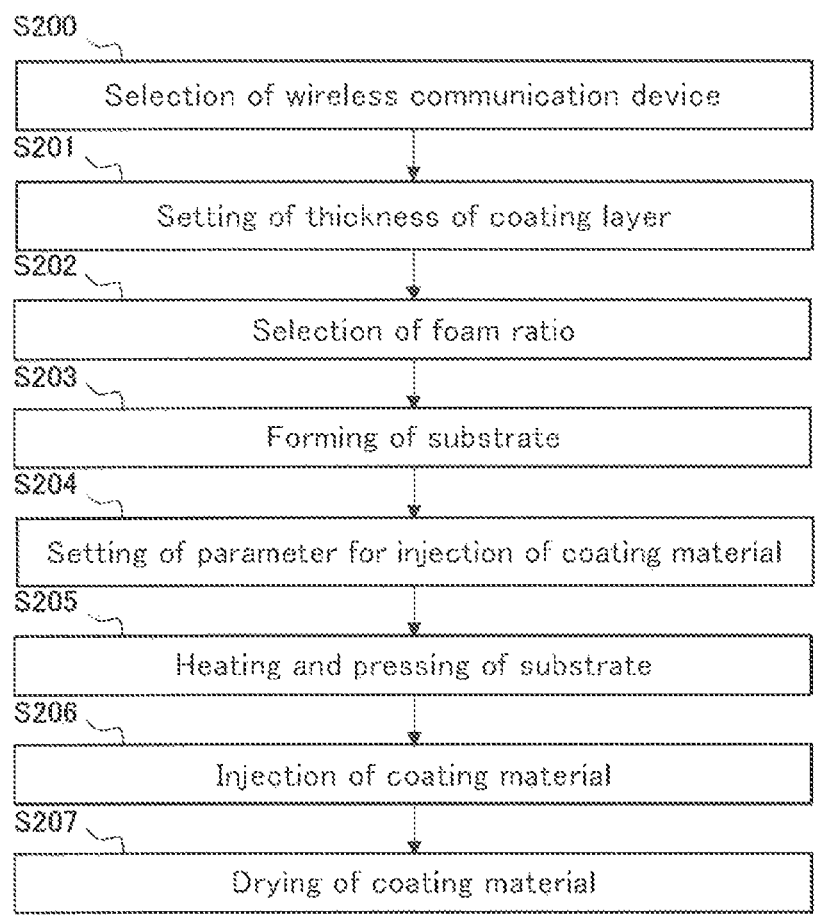
FIG. 9 is a flowchart illustrating an example of a process for manufacturing a protective material.

FIG. 9 is a flow chart illustrating an example of a manufacturing process of a protective material. First, the type of wireless communication device to which the protective material is provided with is selected (step S200). The protective material is, for example, a radome 110. For example, the use of protective material may be selected from a variety of applications such as for aircraft, automobiles, and FFIDs. In step S201 of the setting of thickness of the coating layer 113, the thickness of the coating layer 113 (T1 and T2) is set depending on the required specification of the loss of radio wave or dielectric constant εr of the protective material. The dielectric constant εr of the substrate 112 is close to the specific dielectric constant εr of air 1.0. Thus, the thickness T3 of the substrate 112 is unlikely to affect the loss of radio waves of the protective material or the dielectric constant εr. On the other hand, the dielectric constant εr of the coating layer 113 is higher than the dielectric constant εr of air. Thus, the thickness of the coating layer 113 (T1 and T2) is likely to affect the loss of radio waves of the protective material or the dielectric constant εr.

In step S202 of selection of the foam ratio, the foam ratio of the foam synthetic resin used in the resin molding body is selected. Next, in step S203 of forming the substrate, the foam synthetic resin substrate is molded into a predetermined shape. For example, the substrate 112 of a foam synthetic resin is molded into the form of a protective material. For example, the substrate is molded into the form of a radome 110. In step S203, a mold may be used to mold the substrate 112. The shaped substrate 112 may also be cut into a predetermined shape.

Next, in step S204 of setting of the parameter, the parameters for injection of the coating material are set. Such parameters include, for example, the amount of injection of the coating material per unit time relative to the unit area of the substrate 112. The amount of injection per unit area of the substrate 112 can be adjusted according to the delivery rate of the substrate 112 or the like.

The substrate 112 is also heated and pressed at step S205 of heating and pressing of substrate. The substrate 112 is heated to remove moisture contained in the substrate 112. This reduces the unevenness of the coating layer 113 formed on the surface of the substrate 112. If the substrate 112 contains a large amount of moisture, for example, the protective material may warp. Furthermore, by pressing the substrate 112, the bubbles on the surface of the substrate 112 collapse and the resin density on the surface of the substrate 112 becomes higher than the resin density on the center of the substrate 112. This prevents the coating material from diffusing into the substrate 112 when the coating material is sprayed onto the surface of the substrate 112. One of step S204 and step S205 may be performed first or the both may be performed simultaneously. The process of pressing the substrate 112 may also be omitted.

Next, in step S206 of injection of coating material, a coating material is injected onto the substrate 112. In step S206, a coating material may be sprayed over the entire surface of the substrate 112. In step S206 of coating material, the coating material may be sprayed uniformly by an automation, and the coating material may be locally sprayed on the portion of the material to be thickened. If the thickness of the coating layer 113 increases, the loss of radio waves increases. Accordingly, the thickness of the coating layer 113 may be changed such that the thickness of the portion provided in the direction in which the wireless communication portion 120 transmits or receives radio waves is less than the thickness of the other portion. Accordingly, in the direction in which the wireless communication portion 120 transmits or receives radio waves, the loss (permeation loss) of the radio waves can be reduced, and the strength of the radome 110 can be increased in other directions. Also, the thickness T1 of the coating front surface portion 114 may be thicker than the thickness T2 of the coating back surface portion 115 by adding the step of spraying the coating material on the front side surface 12 of the substrate 112.

Even if the thickness of the coating layer 113 is reduced, the automation of the injection process allows the coating layer 113 to be formed in the required regions of the front side surface 12, the back side surface 14, and the end surface 26 of the substrate 112 without lack of the coating material.

In step S206 of injection of coating material, a polyurea resin may be formed by injection of a solution A containing a polyisocyanate compound and injection of a solution B containing a polyamine to react on the substrate 112. The coating material is then dried in step S207 of drying of coating material. This forms a coating layer 113 on both front and back side surfaces and end surface of the substrate 112.

During movement of the substrate 112 on the roller conveyor, two solutions may be injected from the injection devices located above, below, and side of the roller conveyor, respectively. The polyurea resin is then dried to form the coating layer 113 of the polyurea resin on the surface of the substrate 112. Such methods enable the mass production of homogeneous resin molds in short-term. However, the method of manufacturing the protective material is not limited to the case shown in FIG. 9.

Figure 10:
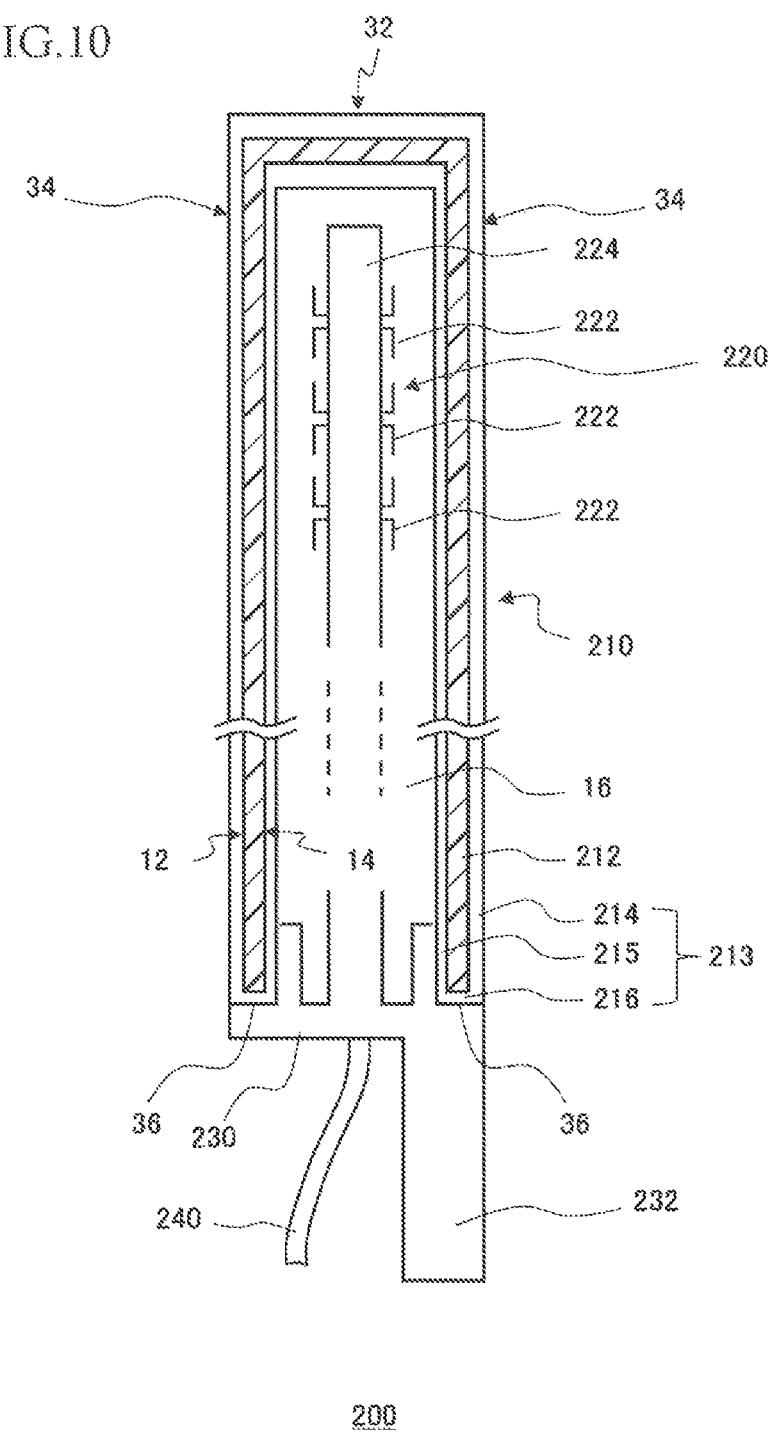
FIG. 10 is a cross-sectional view illustrating an example of a base station antenna device 200 comprising the radome 210 according to a sixth embodiment of the present invention.

FIG. 10 is a cross-sectional view illustrating an example of a base station antenna device 200 comprising a radome 210 according to a sixth embodiment of the present invention. The base station antenna device 200 is an example of a wireless communication device. The base station antenna device 200 of this example is an antenna for a base station for communication with a wireless communication terminal. The base station antenna device 200 may be an antenna device for direct communication with a wireless communication terminal, such as a smartphone and a cell phone.

The base station antenna device 200 includes a wireless communication portion 220 for wireless communication. The wireless communication portion 220 includes a dipole 222, which is a plurality of radiating elements, as an antenna portion. That is, the wireless communication portion 220 may include a dipole type antenna portion. The dipole type antenna portion may be designed as a lumped-parameter network circuit. The dipole type antenna portion is preferably used for radio waves at frequency of 2 GHz or less.

The plurality of dipoles 222 may be arranged along a predetermined array direction. The wireless communication portion 220 includes a support portion 224. The support portion 224 may be stretched along an array direction. A plurality of dipoles 222 may be secured to the support portion 224. The radome 210 is tubularly shaped. In this example, the radome 210 is cylindrically shaped. The radome 210 may extend in the direction in which the support portion 224 is stretched, i.e., in the array direction described above.

The inner diameter of the radome 210 is greater than the lateral dimension of the wireless communication portion 220. The radome 210 is formed in a shape that covers the wireless communication portion 220. The radome 210 may have a top surface 32 and a side surface 34 extending from the periphery of the top surface 32. In this example, the top surface 32 may be circular, elliptical, or rectangular in planar view. Planar vision means viewing from a direction perpendicular to the top surface 32.

The base station antenna device 200 may include a bottom portion 230. The end of the side surface 34 of the radome 210 may be secured to the bottom portion 230. The bottom portion 230 may support the radome 210 and the wireless communication portion 220. A part of the bottom portion 230 may be provided with a mounting portion 232 for mounting the base station antenna device 200 to a pole or the like. The mounting portion 232 may be provided by a fastener such as a pole. A housing space 16 is formed between the radome 210 and the bottom portion 230. The housing space 16 includes the wireless communication portion 220. Signals from the wireless communication portion 220 may be outputted by signal lines 240. However, the shape of the radome 210 is not limited to the case shown in FIG. 10.

The radome 210 has a substrate 212 and a coating layer 213. The coating layer 213 may be formed of a polyurea resin. The configuration of the substrate 212 and the coating layer 213 is similar to that of the substrate 112 and the coating layer 113 in the first to fifth embodiments. The substrate 212 in this example is also formed of a foam synthetic resin. The coating layer 213 may comprise a coating front surface portion 214, a coating back surface portion 215, and a coating end surface portion 216, as in the first embodiment described above (FIGS. 1 and 2), the third embodiment (FIG. 6), and the fourth embodiment (FIG. 7).

In these cases, the coating layer 213 may be formed on the entire surface of the substrate 212.

In the case that the coating layer 213 is formed on the entire surface of the substrate 212, the end surface 36 of the radome 210 also prevents peeling of the coating layer 213 from proceeding from the end surface 36, by covering the substrate 212 with the coating layer 213. Also, the coating layer 213 formed on the front side surface 12, the back side surface 14 and the end surface 36 of the substrate 212 are interconnected to each other to provide sufficient strength to the radome 210.

The thickness of the coating layer 213 is less than the thickness of the substrate 212. Specifically, the thickness of the coating front surface portion 214 and the thickness of the coating back surface portion 215 are less than the thickness of the substrate 212, respectively. The thickness of the coating front surface portion 214 may also be greater than the thickness of the coating back surface portion 215.

The coating back surface portion 215 may also be omitted as in the second embodiment described above (FIG. 5). In this case, multiple reflections of radio waves between the coating front surface portion 214 and the coating back surface portion 215 prevent interference or the like from occurring. Also, the overall thickness of the coating layer 213 is reduced because the coating back surface portion 215 is omitted. Therefore, the loss of radio waves can be reduced.

The coating layer 213 may have a dielectric constant εr of 2 or more to 4 or less, and in particular may be 3 or more to 4 or less. The dielectric constant εr of the coating layer 213 is higher than the dielectric constant εr of the substrate 212. Thus, the lower the thickness of the coating layer 213 relative to the thickness of the substrate 212 is, the lower the relative dielectric constant εr for the entire radome 210 can be.

The wireless communication portion 220 of the present embodiment primarily receives or transmits radio waves from the center of the radome 210 toward the side surface 34. On the other hand, in this embodiment, the intensity of radio waves, which the radio communication portion 220 transmits or receives to the direction of the top surface 32 of the cylindrically shaped radome 210, is lower compared to the intensity of radio waves transmitted or received to the direction of the side surface 34 of the cylindrically shaped radome 210. Accordingly, the direction to the cylindrically shaped side surface 34 is the direction in which the wireless communication portion 220 transmits or receives radio waves.

In this embodiment, the thickness of the coating layer 213 covering both front and back surfaces of the substrate 212 at the cylindrically shaped side surface 34 of the radome 210 is smaller than that of the coating layer 213 at other portions of the radome 210. The thickness of the coating layer 213 of the portion provided in the direction in which the wireless communication portion 220c radio waves is less than the thickness of the other portion. Specifically, the coating layer 213 at the top surface 32 of the cylindrically shaped radome 210 is thicker than the coating layer 213 at the side surface 34 of the radome 210. The thickness of the coating layer 213 of the portion that resides in the direction of transmitting or receiving radio waves from the wireless communication portion 220 may be less than ⅔ or less of the coating layer 213 of the other portion, may be less than ½ or less, and may be less than ⅓ or less.

Thus, the thickness of the coating layer 213 can be varied depending on the position on the substrate 212 in order to avoid the attenuation of the radio waves within the area of the desired directivity of the wireless communication portion 220, and the thickness of the coating layer 213 at a position that is not related to the reception or transmission of the radio waves is secured to ensure the strength of the entire radome 210. The thickness of the coating layer 213 in the direction in which the radio waves are to be attenuated may be greater than the thickness of the coating layer 213 in the direction in which the radio waves are transmitted or received. As described above, the coating layer 213 may be used to ensure strength in the radome 210 and to adjust the directivity of the radio waves.

Figure 11:
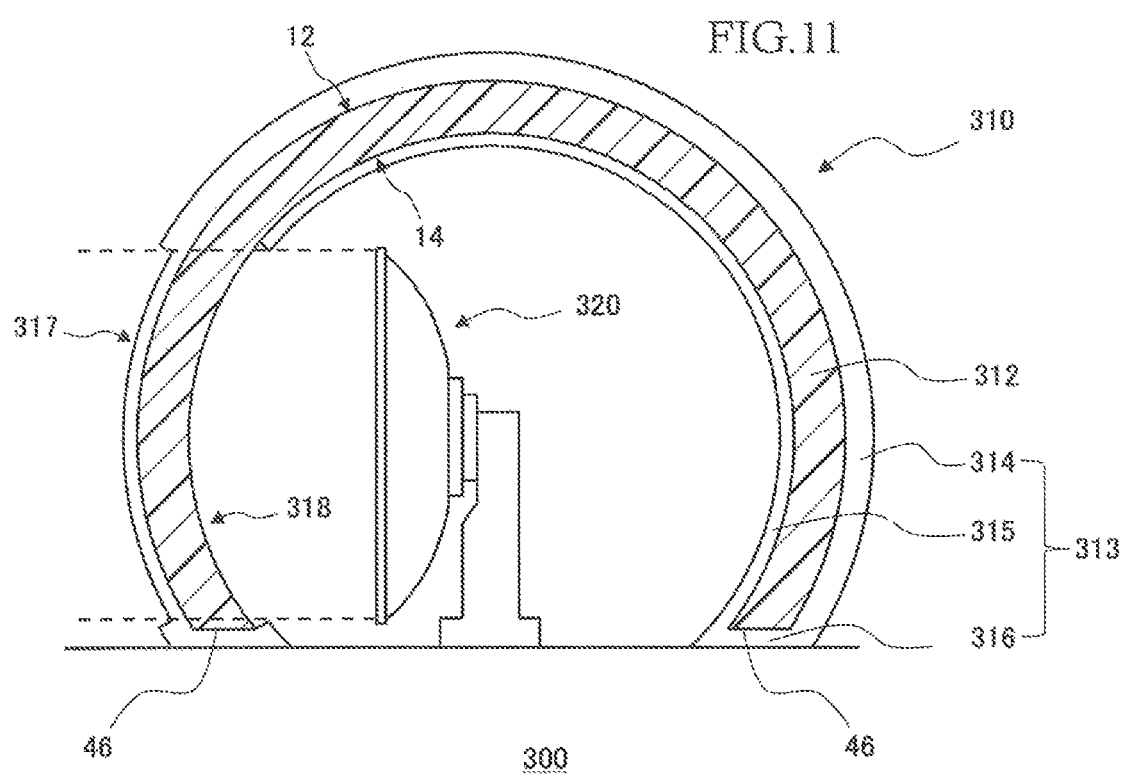
FIG. 11 is a cross-sectional view illustrating an example of a wireless communication device 300 comprising the radome 310 according to a seventh embodiment of the present invention.

FIG. 11 is a cross-sectional view illustrating an example of a wireless communication device 300 comprising a radome 310 according to a seventh embodiment of the present invention. The wireless communication device 300 includes a wireless communication portion 320. The wireless communication portion 320 may include a parabolic antenna portion. The parabolic antenna portion may be designed as an equivalent circuit of a distribution-parameter network circuit. The parabolic antenna portion is suitably used for radio frequencies of 2 GHz or more.

In this example, the radome 310 may have a spherical shell shape. The wireless communication portion 320 is stored in the interior space formed by the radome 310. The radome 310 has a substrate 312 and a coating layer 313. The coating layer 313 may be formed of a polyurea resin. The configuration of the substrate 312 and the coating layer 313 is similar to that of the substrate 112 and the coating layer 113 in the first to fifth embodiments. The substrate 312 in this example is also formed of a foam synthetic resin. The coating layer 313 may comprise a coating front surface portion 314, a coating back surface portion 315, a coating end surface portion 316, as in the first embodiment described above (FIGS. 1 and 2), the third embodiment (FIG. 6), and the fourth embodiment (FIG. 7).

In the example illustrated in FIG. 11, like the fourth embodiment illustrated in FIG. 7, the coating layer 313 has a through hole 318 formed in the coating back surface portion 315 provided on the back side surface 14 of the substrate 312. The back side surface 14 of the substrate 312 in the area of the through hole 318 is not covered by a coating back surface portion 315 which is a polyurea resin. The area of the through hole 318 is exposed on the back side surface 14 of the substrate 312.

In this example, a range sandwiched between dotted lines indicates a range of directivity of the wireless communication portion 320. The range of the directionality of the wireless communication portion 320 corresponds to the direction in which the wireless communication portion 320 transmits or receives radio waves. In this example, the through hole 318 is formed in the back surface portion 315 in the direction in which the wireless communication portion 320 transmits or receives radio waves. Accordingly, the coating back surface portion 315 is partially omitted so that the attenuation of the radio waves can be reduced. On the other hand, in a direction other than the direction in which the wireless communication portion 320 transmits or receives radio waves, a coating layer 313, such as the coating back surface portion 315, is provided. At the end surface 46 of the radome 310, the substrate 312 is covered by the coating layer 313 to prevent peeling of the coating layer 313 from moving from the end surface 46 and the strength of the radome 310 can also be increased.

In this example, as in the third embodiment shown in FIG. 6, a thickness of the coating layer 313 of the portion provided in the direction in which the wireless communication portion 320 transmits or receives radio waves is less than the thickness of the other portion. In this example, the coating front surface portion 314 of the coating layer 313 differs in thickness corresponding to the range of directivity of the wireless communication portion 320. The coating front surface portion 314 includes a transmission portion 317 in the direction in which the wireless communication portion 320 transmits or receives radio waves. The thickness of the transmission portion 317 is less than the thickness of the portion of the coating front surface portion 314 other than the transmission portion 317. In this example, the transmission portion 317 is provided in the portion of the coating front surface portion 314 facing to the parabolic antenna portion of the wireless communication portion 320.

However, the radome 310 is not limited in this case. The through hole 318 may be omitted. The entire coating back surface portion 315 may also be omitted. Alternatively, the transmission portion 317 may be formed in the coating back surface portion 315 instead of forming the transmission portion 317 in the coating front surface portion 314. As in the present example, in the wireless communication device 300 having a parabolic antenna portion, the attenuation of radio waves can be reduced while the strength of the radome 310 can be secured.

Figure 12:
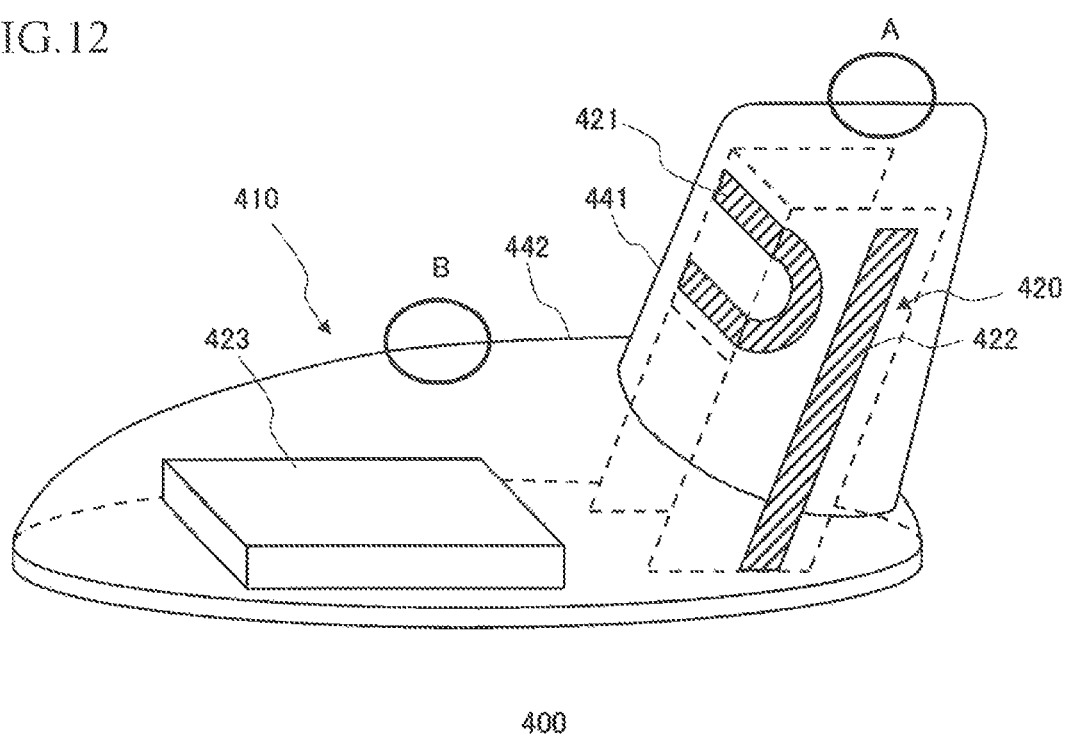
FIG. 12 illustrates an example of an in-vehicle antenna device 400 comprising the radome 410 according to an eighth embodiment of the present invention.

FIG. 12 is a diagram illustrating an example of an in-vehicle antenna device 400 comprising a radome 410 according to an eighth embodiment of the present invention. In FIG. 12, the wireless communication portion 420 may include a loop antenna 421, a linear antenna 422, and a control circuit 423. The radome 410 includes a mast portion 441 and a dome portion 442. In this example, the in-vehicle antenna device 400 may be mounted on the upper surface of the roof of the vehicle. The shape of the radome 410 preferably reduces the area of the surface facing the fluid from the front of the in-vehicle antenna device and is stream-lined with respect to the fluid from the front. One example of a streamlined type may be a sharkfin type with a mast portion shown in FIG. 12.

In the radome 410, the cross-sectional structures of the A portion of the mast portion 441 and the B portion of the dome portion 442 are similar to the cross-sectional structures shown in the first to fifth embodiments. Therefore, the detailed explanation is omitted. The radome 410 includes a substrate formed of foam synthetic resin and a coating layer comprising a polyurea resin that covers at least a surface of the substrate. In the in-vehicle antenna device 400, such as the present example, the strength can be secured while the amount of radio waves transmitted or received that are attenuated by the radome 410 can be reduced.

Figure 13:
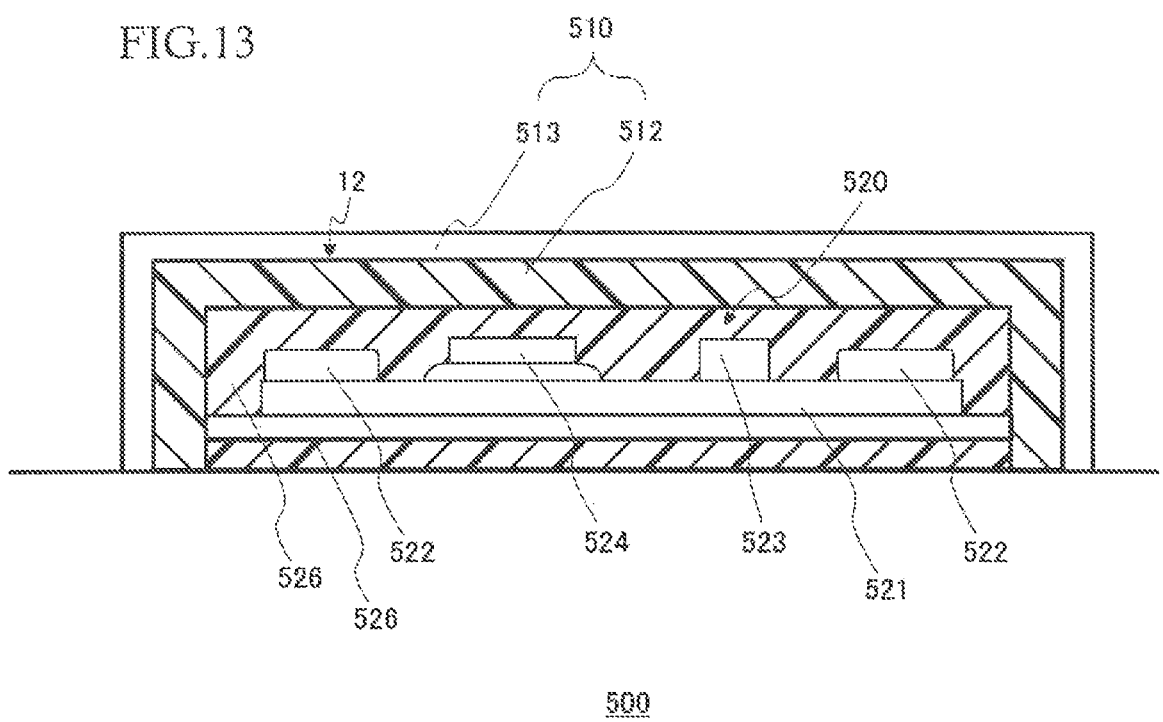
FIG. 13 illustrates an example of a wireless tag device 500 comprising the protective material 510 according to a ninth embodiment of the present invention.

FIG. 13 is a diagram illustrating an example of a radio tag device 500 comprising a protective material 510 according to a ninth embodiment of the present invention. As the protective material 510, the same configuration as the radome described in the first to eighth embodiments above may be employed. The wireless tag device 500 is an example of a wireless communication device. The wireless tag device 500 includes a protective material 510 and a wireless communication portion 520. In FIG. 13, the wireless communication portion 520 may include an antenna portion 522 disposed on the substrate 521, a discrete component such as a capacitor 523, and an integrated circuit 524. The antenna portion 522 functions as a radiating element. In this example of the wireless communication portion 520, such as the antenna portion 522, the capacitor 523, and the integrated circuit 524 may be sealed by a curing resin 526 such as an epoxy resin. Thus, the surface of the wireless communication portion 520 is covered with the cured resin 526.

In this example, the protective material 510, which further protects the outside of the wireless communication portion 520 sealed with the curing resin 526, is provided. The protective material 510 includes a substrate 512 and a coating layer 513. The substrate 512 covers the cured resin 526. In one example, a recess provided on the substrate 512 is fitted with a wireless communication portion 520 sealed with the curing resin 526. The substrate 512 is formed of a foam resin. The substrate 512 may be formed by inserting the foam resin into the mold of a wireless communication section 520 protected by the cured resin 526.

The protective material 510 includes a coating layer 513 covering the front side surface 12 of the substrate 512. In this example, the coating layer 513 covers the front side surface 12 of the substrate 512. The coating layer 513 may cover the back side surface of the substrate 512. The substrate 512 and the coating layer 513 may have the same configuration as the substrate 112 and the coating layer 113 in the first to fifth embodiments. In the example shown in FIG. 13, the lower surface of the wireless communication portion 520 is not covered with a protective material 510. However, the lower surface of the wireless communication portion 520 may also be covered with a protective material 510.

Figure 14:
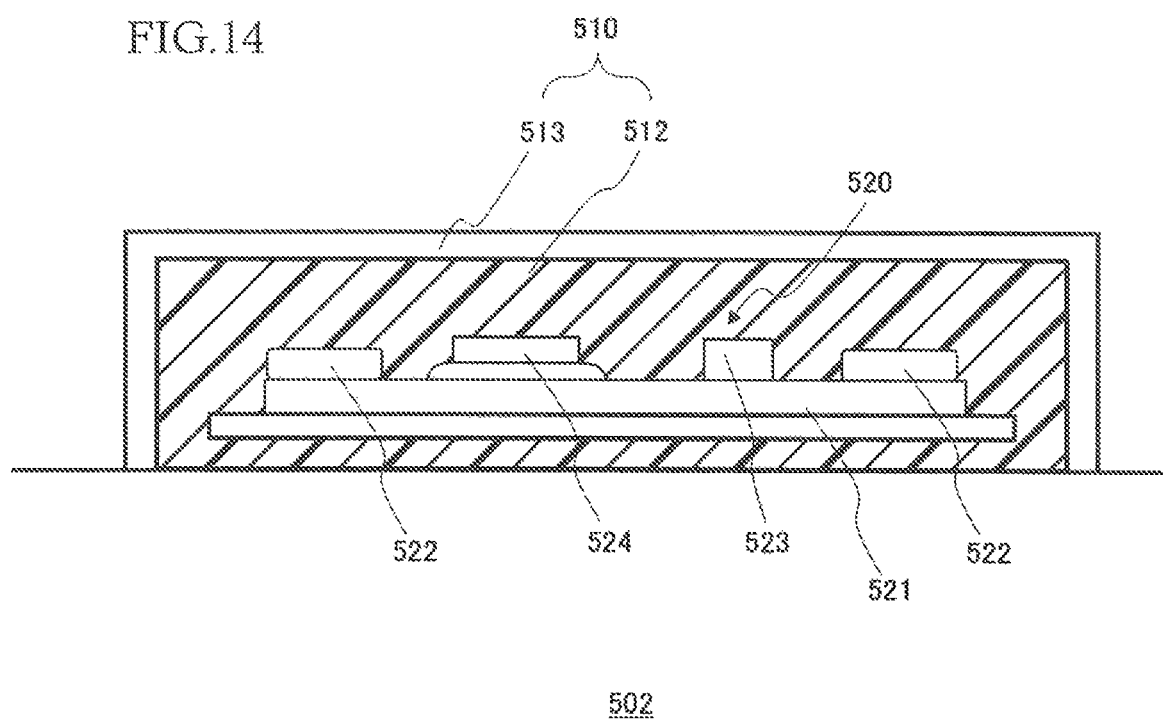
FIG. 14 illustrates an example of the wireless tag device 500 comprising the protective material 510 according to a tenth embodiment of the present invention.

FIG. 14 is a diagram illustrating an example of a radio tag device 502 comprising a protective material 510 according to a tenth embodiment of the present invention. The wireless tag device 502 includes a wireless communication portion 520 for wireless communication. The wireless communication portion 520 may include an antenna portion 522, a capacitor 523, and an integrated circuit 524 disposed on the substrate 521. Unlike the case of the ninth embodiment, the wireless communication portion 520 does not include a cured resin. The periphery of the antenna portion 522, capacitor 523, and integrated circuit 524 is covered with a substrate 512. Accordingly, the substrate 512 also serves as a curing material in the ninth embodiment. The wireless tag device 500 of this embodiment has the same configuration as the wireless tag device of the ninth embodiment, except that it does not include a cured resin. Therefore, the same code is used for the same configuration. The repetition explanation is omitted.

The protective material 510 includes a substrate 512 and a coating layer 513. The substrate 512 covers the wireless communication portion 520. The antenna portion 522, the capacitor 523, and the integrated circuit 524 are mounted to the substrate 521 to form the wireless communication portion 520. The base material 512 may be formed by inserting the foam resin into the mold of the wireless communication portion 520.

The protective material 510 includes a coating layer 513 covering the surface 12 of the substrate 512. In this example, the coating layer 513 covers the surface 12 of the substrate 512. The substrate 512 and the coating layer 513 may have the same configuration as the substrate 112 and the coating layer 113 in the first to fifth embodiments. According to the present example, the substrate 512 comprising the protective material 510 is used as a sealing material by using the substrate 512 instead of the curing resin.

Figure 15:
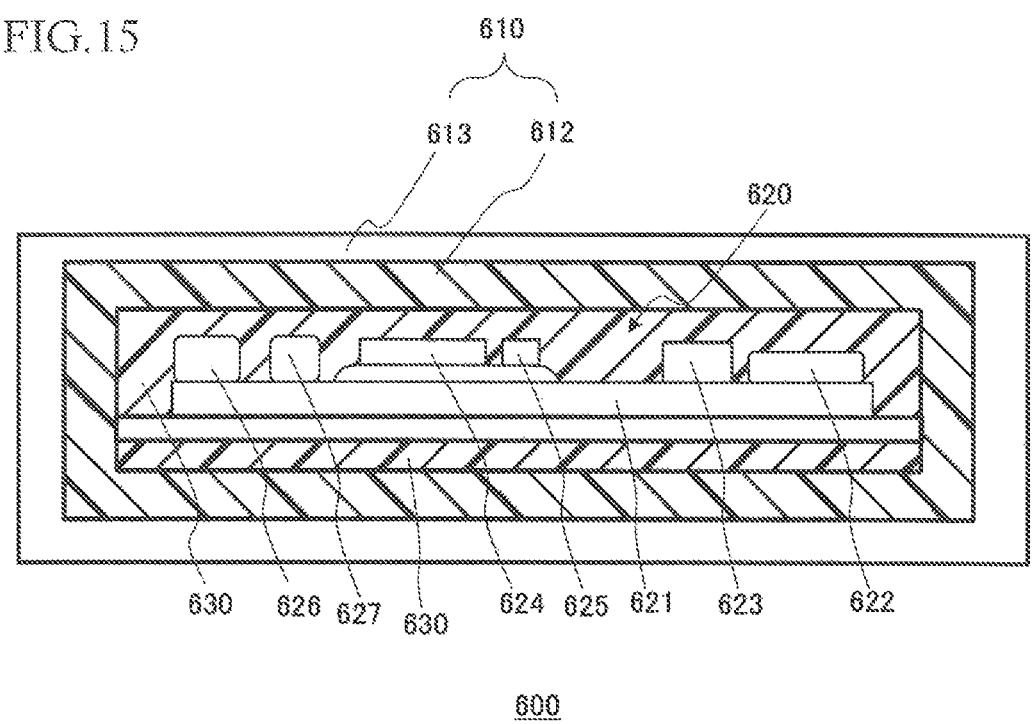
FIG. 15 illustrates an example of an IoT communication module 600 comprising the protective material 610 according to an eleventh embodiment of the present invention.

FIG. 15 illustrates an example of an IoT communication module 600 comprising a protective material 610 according to the eleventh embodiment of the present invention. As the protective material 610, the same configuration as the radome described in the first to eighth embodiments above may be employed. The IoT communication module 600 is a wireless communication module for the Internet of Things (IoT). The IoT communication module 600 can be attached to various "Things" such as various sensors or devices. The IoT communication module 600 allows a variety of goods to be connected to a network such as the Internet. The IoT communication module 600 allows for mutual control of various objects. In this IoT communication module 600, various items are connected by wireless communication, for example, to exchange information.

The IoT communication module 600 includes a protective material 610 and a wireless communication section 620. The wireless communication portion 620 may be surrounded by a protective material 610. However, the IoT communication module 600 may have portions that are not covered by the protective material 610, such as when the openings and wiring for sensor are provided.

In FIG. 15, the wireless communication portion 620 may comprise a wireless communication-related component 622 disposed on a substrate 621, an interface-related component 623, a controller 624, a memory 625, a power supply-related component 626, and a sensor portion 627. The wireless communication-related component 622 is a variety of components for realizing signal transmission and reception functions. In one example, wireless communication-related component 622 may include at least a portion of RFIC (Radio Frequency Integrated Circuit), power amplifiers, filters, and switch elements.

The interface-related component 623 is a variety of components that provide the function of interface between the wireless communication-related component 622 and the external device. The interface-related component 623 is a wireless communication-related component 622. It may include a component that provides the function of interfacing with other components within the IoT communication module 600. However, the wireless communication portion 620 does not necessarily have an interface-related component 623.

The power supply-related component 626 includes a variety of components that provide a power supply to the wireless communication-related component 622. In one example, the power supply-related component 626 includes a battery. In another example, the power supply-related component 626 may convert the power supplied from the outside of the IoT communication module 600 to a voltage or current suitable for supplying the wireless communication-related component 622. However, the wireless communication portion 620 does not necessarily have a power supply-related component 626.

The controller 624 may be comprised of any processor, such as a central processing unit (CPU) or a digital signal processor (DSP). The controller 624 achieves a communication function by controlling each part, such as a wireless communication-related component 622, for example. The controller 624 may also implement various functions in the IoT communication module 600 by controlling other various components and/or functions.

The memory 625 stores various information, including data for operation of the IoT communication module 600. The memory 625 can be configured with any storage device, such as various semiconductor memories, including, for example, RAM and ROM. The memory 625 stores various information, such as data processed in the controller 624, for example, to enable the IoT communication module 600 to perform communication functions. The memory 625 also stores programs for operating the IoT communication module and functions as a work memory.

The sensor portion 627 may include one or more sensors. In one example, the sensor portion 627 may include at least one of a range sensor such as a GPS, a position sensor, a temperature sensor, an acceleration sensor, a magnetic sensor, an ultrasonic sensor, a strain sensor, an optical sensor, an infrared sensor, a radiation sensor, a rotation frequency sensor, and a rotation angle sensor. However, the IoT communication module 600 may not necessarily include a sensor.

In this example of the wireless communication portion 620, the wireless communication-related component 622, the interface-related component 623, the controller 624, the memory 625, the power supply-related component 626, and the sensor portion 627 may be sealed by a curing resin 630 such as an epoxy resin. A protective material 610 is provided which further protects the outside of the wireless communication portion 620 sealed with the curing resin 630. The protective material 610 includes the substrate 612 and the coating layer 613. The substrate 612 covers the cured resin 630. The substrate 612 is formed of a foam resin. The substrate 612 may be formed by inserting the foam resin into the mold of the wireless communication portion 620 protected by the cured resin 630.

The protective material 610 includes the coating layer 613 covering the front side surface 12 of the substrate 612. In this example, the coating layer 613 comprises a polyurea resin. The coating layer 613 covers the front side surface 12 of the substrate 612. The coating layer 613 may cover the back side surface of the substrate 612. The substrate 612 and the coating layer 613 may have the same configuration as the substrate 112 and the coating layer 113 in the first to fifth embodiments.

FIG. 16 is a diagram illustrating an example of an IoT communication module 700 comprising a protective material 710 according to a twelfth embodiment of the present invention. The IoT communication module 700 includes a wireless communication portion 720 for wireless communication. The wireless communication portion 720 may comprise a wireless communication-related component 722 disposed on the substrate 721, an interface-related component 723, a controller 724, a memory 725, a power supply-related component 726, and a sensor portion 727. Unlike the case of the eleventh embodiment, the wireless communication section 720 does not include a cured resin. The periphery of each component, such as the wireless communication-related component 722, the interface-related component 723, the controller 724, the memory 725, the power supply-related component 726, and the sensor portion 727, is covered with the substrate 712. Accordingly, the substrate 712 also serves as a curing material in the eleventh embodiment. The IoT communication module 700 of this embodiment has the same configuration as the IoT communication module 600 of the eleventh embodiment, except that it does not include a cured resin. Therefore, the same code is used for the same configuration. The repetition explanation is omitted.

The protective material 710 includes a substrate 712 and a coating layer 713. The substrate 712 covers the wireless communication portion 720. The wireless communication-related component 722, the interface-related component 723, the controller 724, the memory 725, the power supply-related component 726, and the sensor portion 727 are mounted to the substrate 721 to form the wireless communication portion 720. The substrate 712 may be formed by inserting the foam resin into the mold of the wireless communication portion 720. A protective material 710 may enclose the periphery of the wireless communication portion 720.

The protective material 710 includes a coating layer 713 covering the front side surface 12 of the substrate 712. The coating layer 713 may comprise a polyurea resin. In this example, the coating layer 713 covers the entire surface of the substrate 712. The substrate 712 and the coating layer 713 may have the same configuration as the substrate 112 and the coating layer 113 in the first to fifth embodiments. According to the present example, the substrate 712 comprising the protective material 710 can be used as a sealing material by using the substrate 712 instead of the curing resin.

Although the present invention has been described with reference to embodiments, the technical scope of the present invention is not limited to the scope described in the above-described embodiments. It will be apparent to those skilled in the art that various changes or improvements may be made to the above embodiments. It is apparent from the description of the claims that forms with such modifications or modifications may also be included within the technical scope of the invention.

It should be noted that the sequence of execution of each process, such as operation, procedure, step, and stage in the apparatus, system, program, and method illustrated in the claims, the specification, and the drawings, may be implemented in any order unless the sequence of execution of each process is not specifically stated as "prior to" or "beforehand" and the output of the previous process is used in subsequent processing. Even if, for convenience, "first,", "next," and the like are used to describe the flow of operation in the claims, the specification, and the drawings, this does not mean that it is essential to carry out the operation in this order.

DESCRIPTION OF REFERENCES

12 . . . front side surface, 14 . . . back side surface, 16 . . . housing space, 22 . . . end surface, 32 . . . top surface1, 34 . . . side surface, 36 . . . end surface, 100 . . . wireless communication device, 11 . . . radome, 112 . . . substrate, 113 . . . coating layer, 114 . . . coating front surface portion, 116 . . . coating back surface portion, 116 . . . coating end surface portion, 117 . . . transmission portion, 118 . . . through hole, 119 . . . content, 120 . . . wireless communication portion, 122 . . . antenna portion, 210 . . . circuit board, 130 . . . bottom portion, 200 . . . base station antenna device, 210 . . . radome, 212 . . . substrate, 213 . . . coating layer, 214 . . . coating front surface portion, 215 . . . coating back surface portion, 216 . . . coating end surface portion, 220 . . . wireless communication portion, 222 . . . dipole, 224 . . . support portion, 230 . . . bottom portion, 232 . . . mounting portion, 240 . . . signal line, 300 . . . wireless communication portion, 310 . . . radome, 312 . . . substrate, 313 . . . coating layer, 314 . . . coating front surface portion, 315 . . . coating back surface portion, 316 . . . coating end surface portion, 317 . . . transmission portion, 318 . . . through hole, 320 . . . wireless communication portion, 400 . . . in-vehicle antenna device, 421 . . . loop antenna, 422 . . . line antenna, 423 . . . control circuit, 441 . . . mast portion, 442 . . . dome portion, 500 . . . wireless tag device, 502 . . . wireless tag device, 510 . . . protective material, 512 . . . substrate, 522 . . . antenna portion, 523 . . . condenser, 524 . . . integrated circuit, 526 . . . curing resin, 600 . . . IoT communication module, 610 . . . protective material, 612 . . . substrate, 613 . . . coating layer, 620 . . . wireless communication portion, 621 . . . substrate, 622 . . . wireless communication-related component, 623 . . . interface-related component, 624 . . . controller, 625 . . . memory, 626 . . . power supply-related component, 627 . . . sensor portion, 630 . . . curing resin, 700 . . . IoT module, 710 . . . protective material, substrate, 713 . . .

coating layer, 720 . . . wireless communication portion, 721 . . . substrate, 722 . . . wireless communication-related component, 723 . . . interface-related component, 724 . . . controller, 725 . . . memory, 726 . . . power supply-related component, 727 . . . sensor portion

The invention claimed is:

1. A protective material comprising:
a substrate formed of a foam synthetic resin; and
a coating layer including a polyurea resin, wherein
the coating layer is on an entire surface of the substrate so as to cover the entire surface of the substrate, and
the protective material is a radome for protecting an antenna portion of a wireless communication portion of a wireless communication device.

2. The protective material according to claim 1,
wherein a thickness of the coating layer on a front side surface of the substrate is larger than a thickness of the coating layer on a back side surface of the substrate.

3. The protective material according to claim 1,
wherein a thickness of a portion of the coating layer which is provided in a direction in which the wireless communication portion transmits or receives radio waves is less than a thickness of another portion of the coating layer.

4. The protective material according to claim 3,
wherein the protective material has a tubular shape, and
a side surface direction of the tubular shape is a direction in which the wireless communication portion transmits or receives the radio waves.

5. The protective material according to claim 1,
wherein a through hole is formed in a back side surface of the coating layer in a direction in which the wireless communication portion transmits or receives radio waves.

6. The protective material according to claim 5, wherein the protective material has a tubular shape, and
a side surface direction of the tubular shape is a direction in which the wireless communication portion transmits or receives radio waves.

7. The protective material according to claim 1,
wherein a dielectric constant εr of the coating layer is 2 or more to 4 or less.

8. The protective material according to claim 1,
wherein a foam ratio of the substrate is 50 times or more, the thickness of the substrate is 1 mm or more to 5 cm or less, and
the thickness of the coating layer is 0.1 mm or more to 0.5 mm or less.

9. The protective material according to claim 1,
wherein the polyurea resin is mixed with a polyisocyanate compound and a synthetic resin, and
a volume ratio of the polyisocyanate compound to the synthetic resin is 1:0.5 to 1:1.5.

10. The protective material according to claim 9,
wherein the polyurea resin contains polytetrafluoroethylene or hexagonal boron nitride.

11. The protective material according to claim 9,
wherein the polyurea resin is supplemented with at least one of 2,2-bis(3-amino-4-methylphenyl) hexafluoropropane and bis(γ-aminopropyl) tetramethyldisiloxane.

12. The protective material according to claim 10,
wherein the polyurea resin is supplemented with at least one of 2,2-bis(3-amino-4-methylphenyl) hexafluoropropane and bis(γ-aminopropyl) tetramethyldisiloxane.

13. A wireless communication device comprising:
a wireless communication portion that includes an antenna portion; and
a protective material, which is a radome for protecting the antenna portion, including:
a substrate formed of a foam synthetic resin, and
a coating layer including a polyurea resin,
wherein the coating layer is on an entire surface of the substrate so as to cover the entire surface of the substrate.

14. The wireless communication device according to claim 13, wherein the antenna portion is a parabolic type or a dipole type antenna portion.

15. The wireless communication device according to claim 14, wherein the wireless communication device is one of a base station antenna device for communicating with a wireless communication terminal, an in-vehicle antenna device, or a wireless tag device.

16. The wireless communication device according to claim 13, wherein the wireless communication device is an IoT (Internet of Things) communication module.

17. The wireless communication device according to claim 16, wherein the wireless communication device is surrounded by the protective material.

18. A protective material comprising:
a substrate formed of a foam synthetic resin, the substrate having a front side surface, a back side surface, and end surfaces which are surfaces between the front side surface and the back side surface, so that the front side surface, the back side surface, and the end surfaces form an entire surface of the substrate; and
a coating layer including a polyurea resin, wherein
the coating layer is on the front side surface, the back side surface, and the end surfaces of the substrate so as to cover the entire surface of the substrate, and
the protective material is a radome for protecting an antenna portion of a wireless communication portion of a wireless communication device.

* * * * *

UNITED STATES PATENT AND TRADEMARK OFFICE
CERTIFICATE OF CORRECTION

| | |
|---|---|
| PATENT NO. | : 11,817,622 B2 |
| APPLICATION NO. | : 16/978284 |
| DATED | : November 14, 2023 |
| INVENTOR(S) | : Naofumi Takemoto |

It is certified that error appears in the above-identified patent and that said Letters Patent is hereby corrected as shown below:

In the Claims

Column 21, Line 30:
In Claim 4, after "receives" delete "the".

Column 21, Line 46:
In Claim 8, before "thickness" delete "the".

Column 21, Line 48:
In Claim 8, before "thickness" delete "the".

Signed and Sealed this
Thirtieth Day of January, 2024

Katherine Kelly Vidal
*Director of the United States Patent and Trademark Office*